(12) United States Patent
Oh

(10) Patent No.: US 7,544,226 B2
(45) Date of Patent: Jun. 9, 2009

(54) GRILLE FOR A CYCLONE VACUUM

(75) Inventor: Jang-keun Oh, Gwangju (KR)

(73) Assignee: Samsung Gwangju Electronics Co., Ltd. (KR)

( * ) Notice: Subject to any disclaimer, the term of this patent is extended or adjusted under 35 U.S.C. 154(b) by 604 days.

(21) Appl. No.: 11/149,201

(22) Filed: Jun. 10, 2005

(65) Prior Publication Data

US 2006/0130441 A1 Jun. 22, 2006

(30) Foreign Application Priority Data

Dec. 22, 2004 (KR) .................. 10-2004-0110058

(51) Int. Cl.
*B01D 45/12* (2006.01)
(52) U.S. Cl. .................. 55/410; 55/429; 55/459.1; 55/DIG. 3; 15/350; 15/353
(58) Field of Classification Search .................. 55/410, 55/429, 459.1, DIG. 3; 15/350, 353
See application file for complete search history.

(56) References Cited

U.S. PATENT DOCUMENTS

| 6,398,834 | B2 * | 6/2002 | Oh | ........................ | 55/424 |
| 2004/0098827 | A1 | 5/2004 | Oh et al. | | |

FOREIGN PATENT DOCUMENTS

| CN | 1244447 | 2/2000 |
| CN | 1363253 | 8/2002 |
| DE | 19938769 | 3/2001 |
| EP | 0972573 | 1/2000 |
| GB | 2375980 | 12/2002 |
| KR | 10-0412586 | 12/2003 |
| SU | 1358923 | 12/1987 |
| SU | 1708291 | 1/1992 |

OTHER PUBLICATIONS

Russian Federation Office Action dated Nov. 28, 2006.
European Patent Office, Extended European Search Report issued Apr. 26, 2007, with respect to the European Patent Application 05291481.9, filed on Jul. 8, 2005.
Chinese Patent Office, Office Action issued May 18, 2007, with respect to Chinese Patent Application No. 200510081883.4, filed on Jul. 6, 2005.

* cited by examiner

*Primary Examiner*—Robert A Hopkins
(74) *Attorney, Agent, or Firm*—Blank Rome LLP

(57) ABSTRACT

A grille member that can be used, for example, in a cyclone dust-collecting apparatus and a vacuum cleaner comprises a body around which a rotating current is formed, and a plurality of air passages formed at the body to guide the rotating current into the body. In an embodiment, the air passages have a leading surface facing toward a flow direction of the rotating air current and a tail surface upstream from the leading surface relative to the rotating air current, such that at least one plane extending along the tail surface and a line along the flow direction of the rotating air current meet at an obtuse angle. In this way, stagnant vortices are not generated in the vicinity of the tail surfaces of the air passages, and dust and the like do not accumulate in the vicinity of the tail surfaces of the air passages when dirt is centrifugally separated from drawn-in air by the rotating current.

10 Claims, 10 Drawing Sheets

GRILLE FOR A CYCLONE VACUUM

This application claims the benefit of Korean Patent Application No. 2004-110058, filed on Dec. 22, 2004, in the Korean Intellectual Property Office, the disclosure of which is incorporated herein by reference in its entirety.

BACKGROUND OF THE INVENTION

1. Field of the Invention

The present invention relates generally to vacuum cleaners, and more particularly, to improvements in grille members and cyclone dust-collecting apparatus for vacuum cleaners.

2. Description of the Related Art

In general, a cyclone dust-collecting apparatus is used in a vacuum cleaner designed to operate without a dust bag, to draw in dirt-laden air, generate a rotating current in the dirt-laden air, and separate dirt from the air using centrifugal force generated by the rotating current.

FIG. 1 is a view schematically illustrating a conventional cyclone dust-collecting apparatus applied to a vacuum cleaner.

As shown in FIG. 1, the cyclone dust-collecting apparatus 1 comprises a cyclone separator or cyclone body 10, a suction part 11 for drawing in air therethrough, a discharge part 12 for discharging dirt-removed air therethrough, a grille member 13 connected to the discharge part 12, a dirt receptacle 14 for collecting and storing dirt therein, and a flange 17 for preventing the dirt stored in the dirt receptacle 14 from being dispersed or scattered up by air currents.

Operation of the cyclone dust-collecting apparatus 1 is as follows.

Dirt-laden air is drawn in from a cleaning surface by a vacuum motor (not shown) of the vacuum cleaner and guided into the cyclone body 10 through the suction part 11.

Since the suction part 11 is connected tangentially to an inner circumference of the cyclone body 10, the air guided into the cyclone body 10 rotates along the inner circumference of the cyclone body 10 in a direction of arrow A shown in FIG. 2 so that dirt is centrifugally separated from the air.

The dirt centrifugally separated from the air by the rotating current is guided by the inner circumference of the cyclone body 10. Air currents and gravity cause the dirt to fall down into and to be stored in the dirt receptacle 14 via a communication space 15 disposed between the cyclone body 10 and the flange 17.

When the dirt stored in the dirt receptacle 14 is forced upward by an abnormal air current, an under surface of the flange 17 guides the dirt downward, so that the dirt is collected again into the dirt receptacle 14.

The air having the dirt removed therefrom is filtered through air passages 16 of the grille member 13 connected to the discharge part 12 and discharged from the cyclone dust-collecting apparatus I through the discharge part 12.

In the cyclone dust-collecting apparatus 1 constructed as above, as shown in FIG. 3, the grille member 13 consists of a cylindrical body having a plurality of air passages 16, each of which is formed in the shape of a hole or slot. The respective air passages 16 are provided with a leading surface 25 and a tail surface 24. The leading surface 25 and the tail surface 24 are disposed vertically relative to the direction (shown by arrow A) of the rotating air current to draw in the air after the dirt is centrifugally separated by the rotation of the air.

Accordingly, when the air rotates to form the rotating current in the direction of arrow A and thereby to centrifugally separate the dirt therefrom, the air at the vicinity of front ends 24a of the tail surfaces 24 may be stagnant, since the leading surface 25 and the tail surface 24 of the air passages 16 are disposed vertically to the proceeding direction of the rotating current. These areas of stagnant air may cause the dirt, especially fine dust, contained in the air to gather and be accumulated in the vicinity of the front ends 24a of the tail surfaces 24 while the vacuum motor operates. The accumulated fine dust then remains in the vicinity of the front ends 24a of the tail surfaces 24 when the vacuum motor is stopped, with the result that this dust is discharged out of the dust-collecting apparatus 1 with the initial air flow when the vacuum motor is started again. The fine dust discharged out of the dust-collecting apparatus 1 may clog a dust filter (not shown) installed prior to the vacuum motor, thereby reducing dust-collection performance of the vacuum cleaner.

SUMMARY OF THE INVENTION

In an embodiment, a grille member has an improved structure that prevents stagnant air regions that tend to gather dirt such as dust and the like. This grille member may be incorporated into an improved cyclone dust-collecting apparatus and a vacuum cleaner including such apparatus.

In an embodiment, these features are achieved by providing a grille member comprising: a body around which a rotating air current is formed; and a plurality of air passages formed at the body to guide the rotating current into the body, each of the air passages having a leading surface generally facing to a direction of the rotating current and a tail surface upstream from the leading surface along the direction of the rotating current. Each of the air passages may be formed so that at least one plane extending from the tail surface and a line along the direction of the rotating current meet at an obtuse angle at an upstream side of the direction of the rotating current.

In an embodiment, the air passages are formed so that at least one plane extending along the leading surface and a line along the direction of the rotating current meet at an angle in the range of more than 90° and below 180° at the upstream side of the air passage along the direction of the rotating current.

Also, the air passages may be formed in a slot shape.

According to an embodiment of the present invention, a cyclone dust-collecting apparatus is provided that includes: a cyclone body having a suction part through which air is drawn in and a discharge part through which the air is discharged; a grille member connected to the discharge part, for filtering the air; and a dirt receptacle connected to the cyclone body, for collecting and storing dirt separated from the air drawn in through the suction part. The grille member comprises a body around which a rotating current is formed, and a plurality of air passages formed at the body to guide the rotating current into the body, each of the air passages having a leading surface generally facing the direction of the rotating current and a tail surface located upstream from the leading surface along the direction of the rotating current. The air passages are formed so that at least one plane extending along the tail surface and a line along the direction of the rotating current meet at an obtuse angle at an upstream side of the air passage along the direction of the rotating current.

In some embodiments, each of the air passages are formed so that at least one plane extending along the leading surface and a line along the direction of the rotating current meet at an angle in the range of greater than 90° and less than 180° at the upstream side of the air passage along the direction of the rotating current.

In some embodiments, the air passages are formed in the shape of a slot.

According to an embodiment of the present invention, a vacuum cleaner is provided that includes: a cleaner body having a vacuum suction member installed therein; a suction brush connected to the cleaner body and movable along a cleaning surface; and a cyclone dust-collecting apparatus removably mounted in the cleaner body. The cyclone dust-collecting apparatus comprises a cyclone body having a suction part through which air is drawn in and a discharge part through which the air is discharged, a grille member connected to the discharge part for filtering the air, and a dirt receptacle connected to the cyclone body for collecting and storing dirt separated from the air drawn in through the suction part. The grille member comprises a body around which a rotating current is formed, and a plurality of air passages formed at the body to guide the rotating current into the body, each of the air passages having a leading surface generally facing the rotating current and a tail surface upstream of the leading surface along the direction of the rotating current. Each of the air passages is formed so that at least one plane extending along the tail surface and a line along the direction of the rotating current meet at an obtuse angle at an upstream side of the air passage along the direction of the rotating current.

Each of the air passages may be formed so that at least one plane extending along the leading surface and a line in the direction of the rotating current meet at an angle in the range of more than 90° and below 180° at the upstream side of the air passage along the direction of the rotating current.

Also, each of the air passages may be formed in the shape of a slot.

BRIEF DESCRIPTION OF THE DRAWING FIGURES

These and other advantages of the present invention will become more apparent by describing embodiments of the present invention with reference to the accompanying drawing figures, in which.

In the drawing figures, it should be understood that like reference numerals generally refer to like features and structures.

DETAILED DESCRIPTION OF AN EXEMPLARY EMBODIMENT

Exemplary embodiments of a grille member according to the present invention, a cyclone dust-collecting apparatus and a vacuum cleaner including such apparatus will now be described in greater detail with reference to the accompanying drawing figures.

Figure 4:
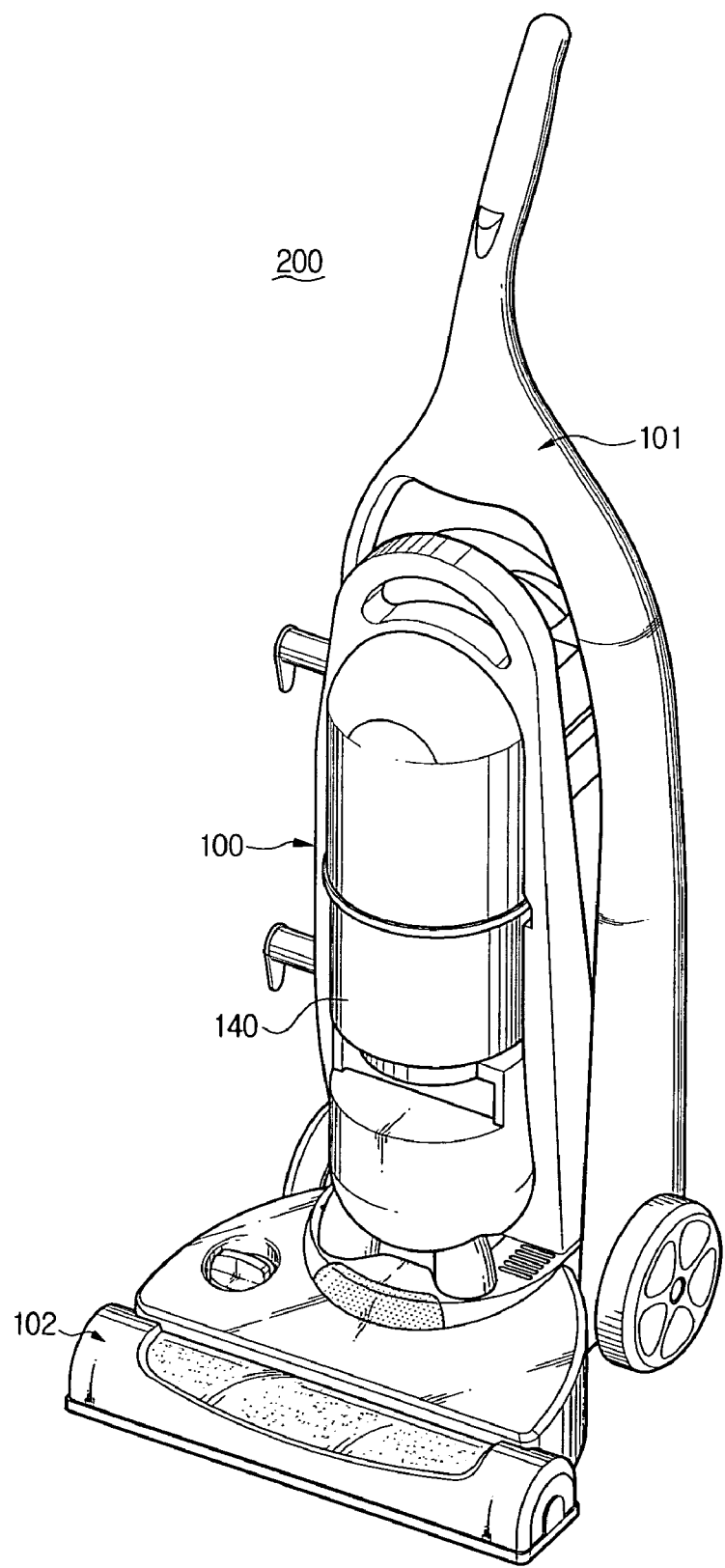
FIG. 4 is a perspective view showing an upright vacuum cleaner having a cyclone dust-collecting apparatus in which a grille member according to an embodiment of the present invention is applied.

FIG. 4 is a view schematically showing an upright vacuum cleaner 200 having a cyclone dust-collecting apparatus with a grille member according to an embodiment of the present invention.

As shown in FIG. 4, the upright vacuum cleaner 200 according to an exemplary embodiment of the present invention comprises a cleaner body 101 having vacuum suction means such as a vacuum motor installed therein, a suction brush 102 for drawing in dirt-laden air from a cleaning surface, and a cyclone dust-collecting apparatus 100 removably mounted in the cleaner body 101, for separating dirt from the intake air.

In this embodiment, the cleaner body 101 and the suction brush 102 are conventional, so detailed descriptions thereof are omitted.

Figure 5:
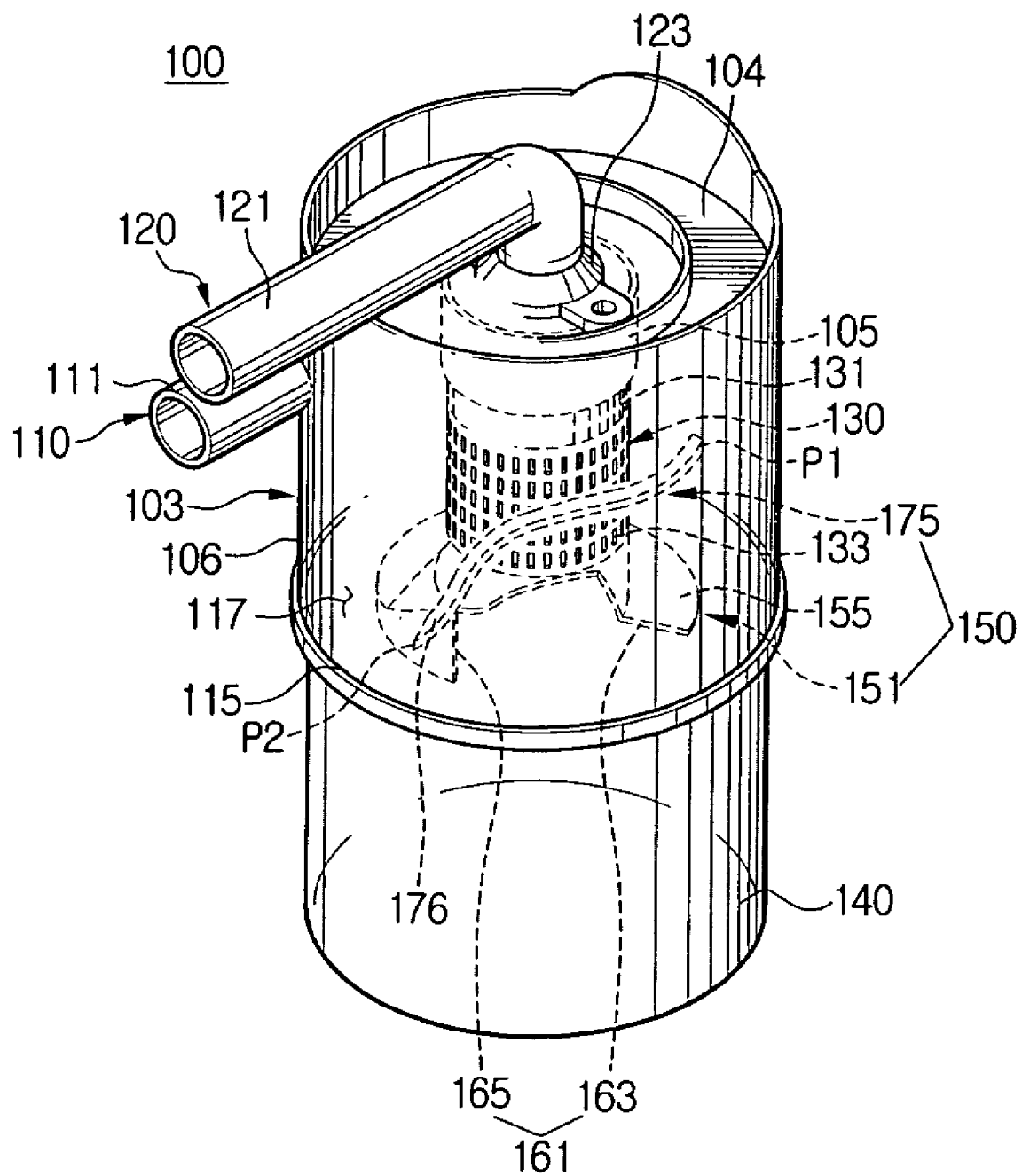
FIG. 5 is a perspective view showing the cyclone dust-collecting apparatus of FIG. 4.

Referring to FIG. 5, the cyclone dust-collecting apparatus 100 comprises a cyclone body 103, a grille member 130, a dirt receptacle 140, and a downstream guide part 150.

The cyclone body 103 comprises a cylindrical trunk 106 having a dust-separating chamber, a suction part 110 through which the dirt-laden air drawn in through the suction brush 102 flows into the cylindrical trunk 106, and a discharge part 120 for discharging air after the dirt has been centrifugally separated from the intake air in the cylindrical trunk 106.

Figure 6:
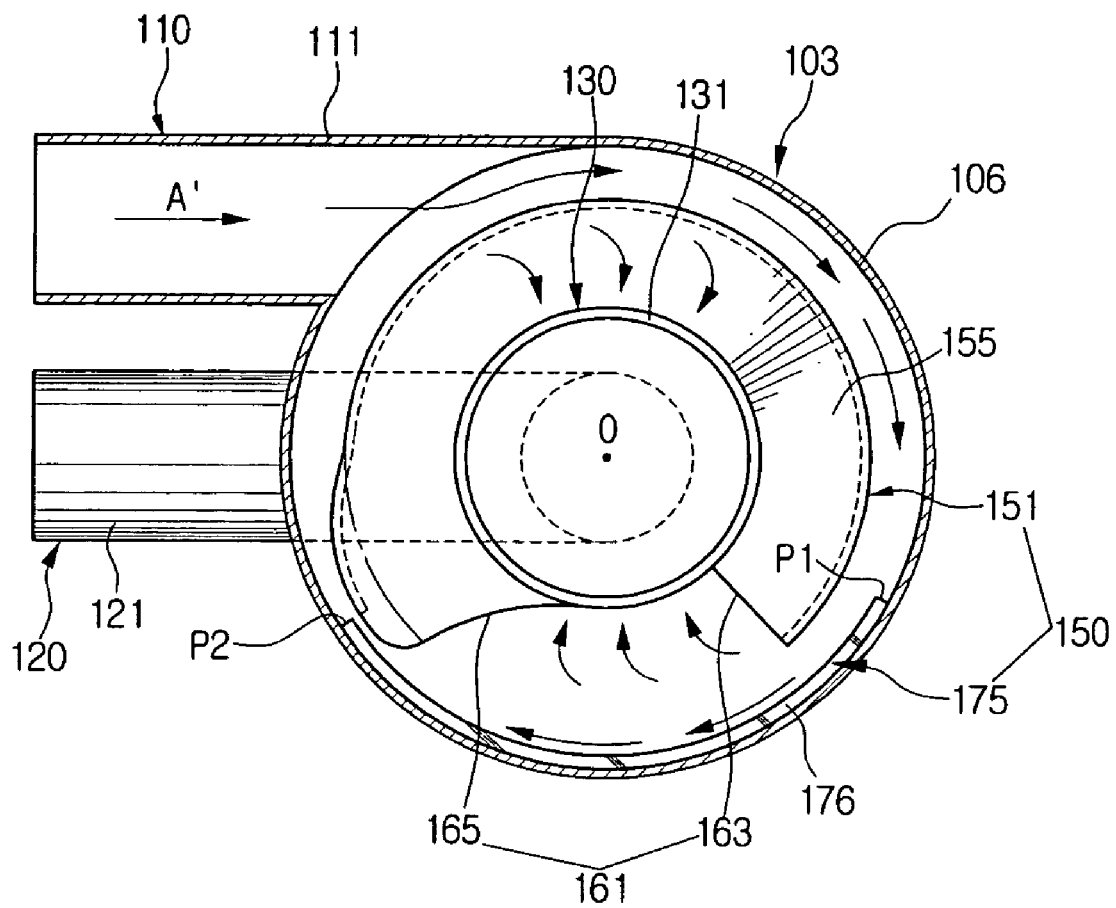
FIG. 6 is a horizontal cross-section view showing the cyclone dust-collecting apparatus of FIG. 5.

The suction part 110 has a first pipe 111 formed on a side of the cylindrical trunk 106 and connected tangentially to an inner circumference of the cylindrical trunk 106. As shown in FIG. 6, the first pipe 111 guides the drawn-in air to move along the inner circumference of the cylindrical trunk 106 in a direction as indicated by the arrows A' of FIG. 6, thereby forming a rotating current. Due to the rotating current, the dirt is centrifugally separated from the intake air.

The discharge part 120 has a second pipe 121 vertically protruding from a center portion of an upper surface 104 of the cylindrical trunk 106 and extending horizontally. The second pipe 121 is connected to the upper surface 104 of the cylindrical trunk 106 through a connection member 123.

An intermediate pipe 105 downwardly protrudes from a lower face of the upper surface 104 of the cylindrical trunk 106 where the second pipe 121 is disposed. The intermediate pipe 105 is connected to an upper end of a cylindrical body 131 of the grille member 130, which will be described in detail below.

In this exemplary embodiment, the grille member 130 comprises cylindrical body 131 connected to the second pipe 121 of the discharge part 120 via the intermediate pipe 105.

Figure 7:
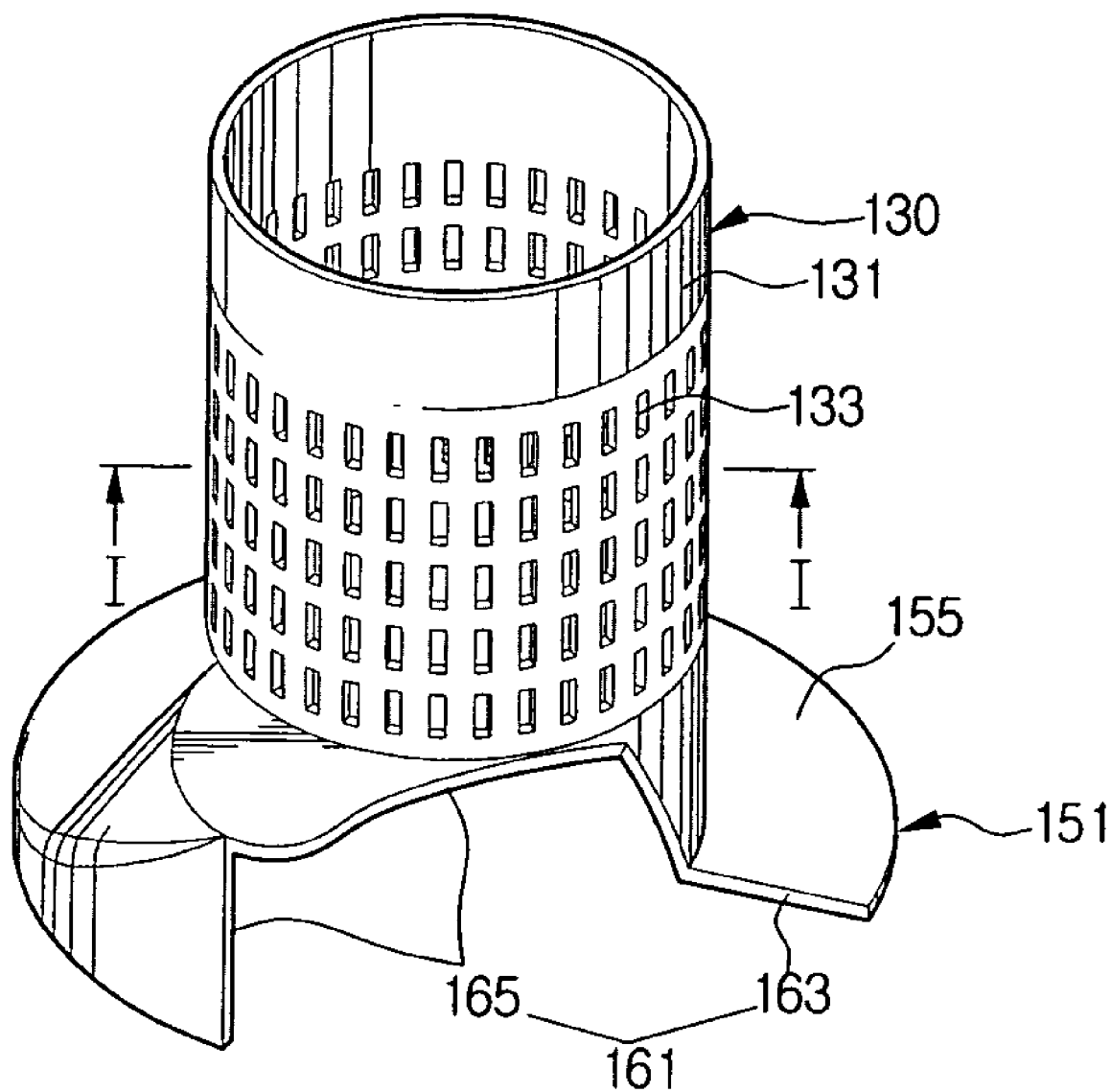
FIG. 7 is a perspective view showing a grille member and a flange of the cyclone dust-collecting apparatus of FIG. 5.

As shown in FIG. 7, the cylindrical body 131 has a plurality of air passages 133 formed thereon at a predetermined interval in a predetermined pattern, each of which has a penetrated hole or a slot shape in the embodiment shown. The air passages 133 draw in the air from which the dirt has been centrifugally separated by the rotating current formed along the inner circumference of the cylindrical trunk 106.

Figure 8:
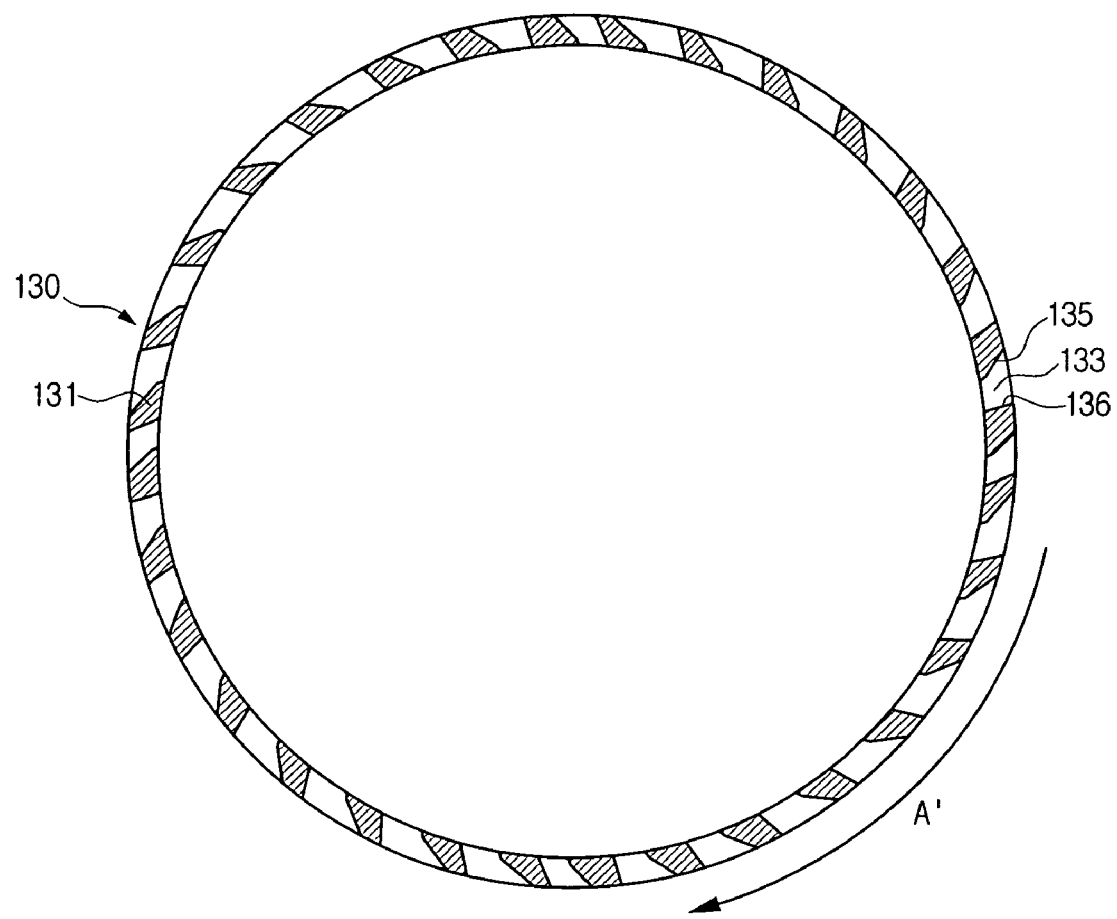
FIG. 8 is a horizontal cross-section view showing the grille member taken along line I-I of FIG. 7.
Figure 9:
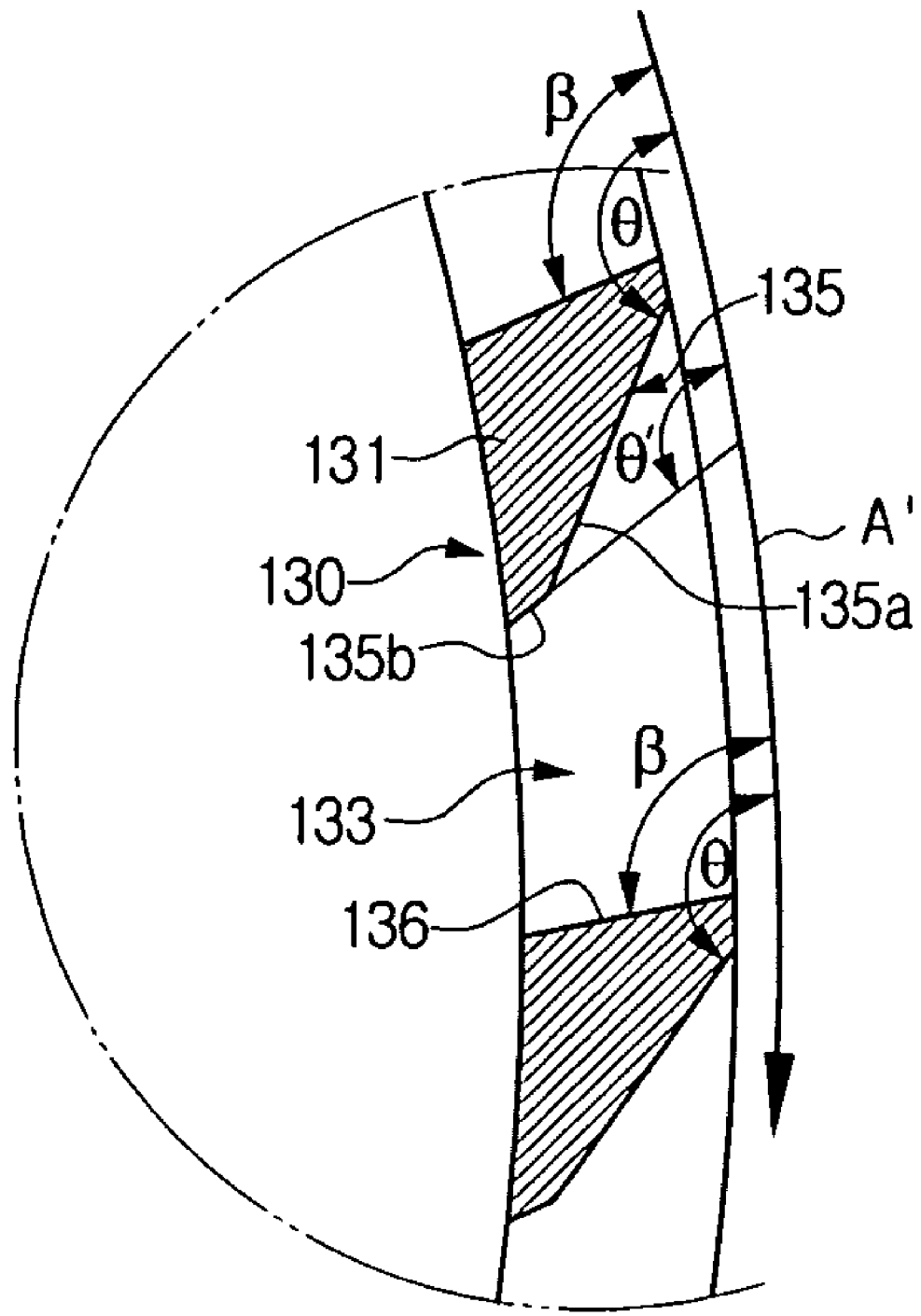
FIG. 9 is a partial horizontal cross-section view showing the grille member of FIG. 8.
Figure 10:
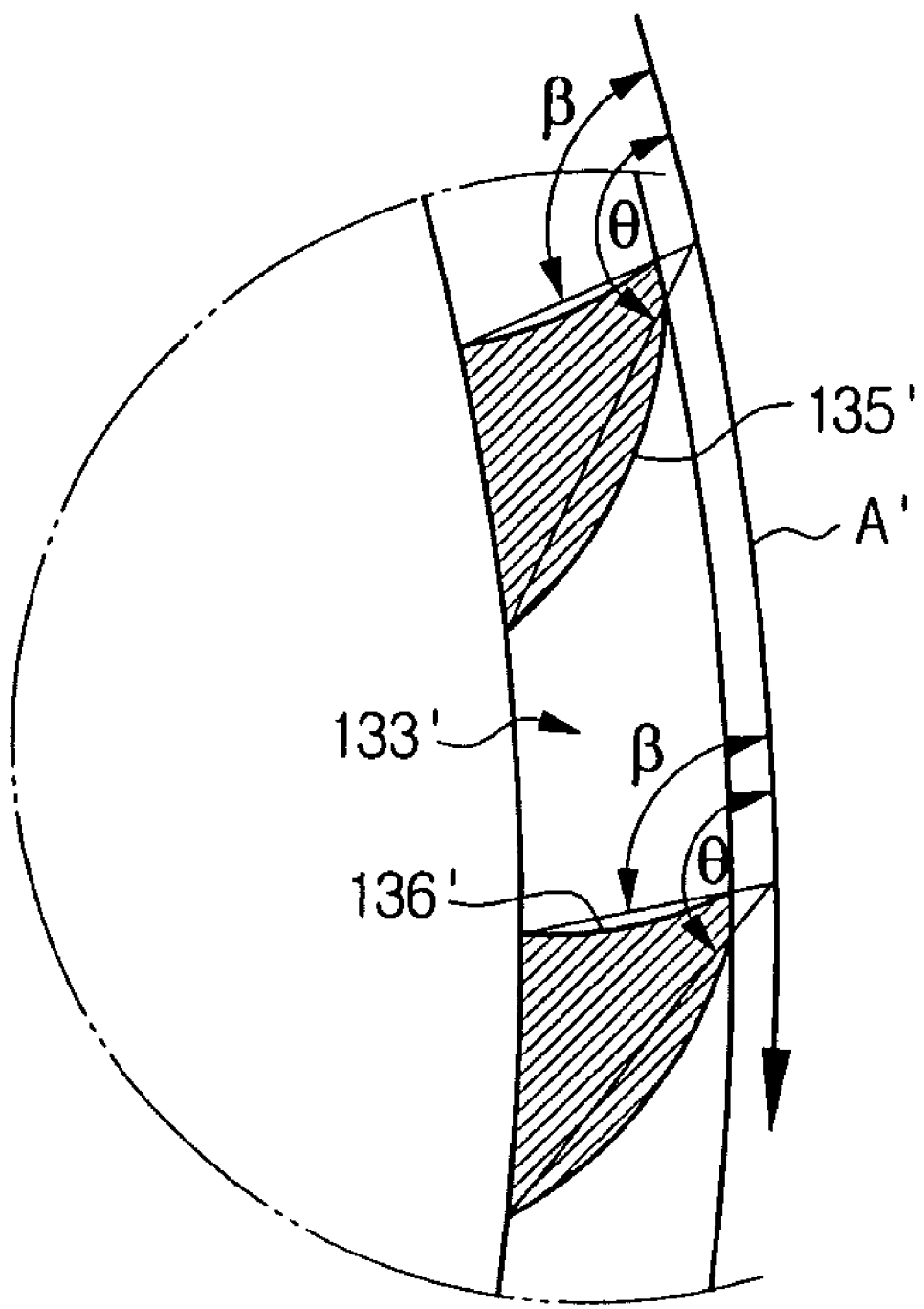
FIG. 10 is a partial horizontal cross-section view showing a modified grille member of the cyclone dust-collecting apparatus of FIG. 5.

As shown in FIGS. 8 and 9, each of the air passages 133 has a leading surface 136 generally facing the flow direction (arrows A') of the rotating current and a tail surface 135 upstream along the flow direction of the rotating current.

Figure 1:
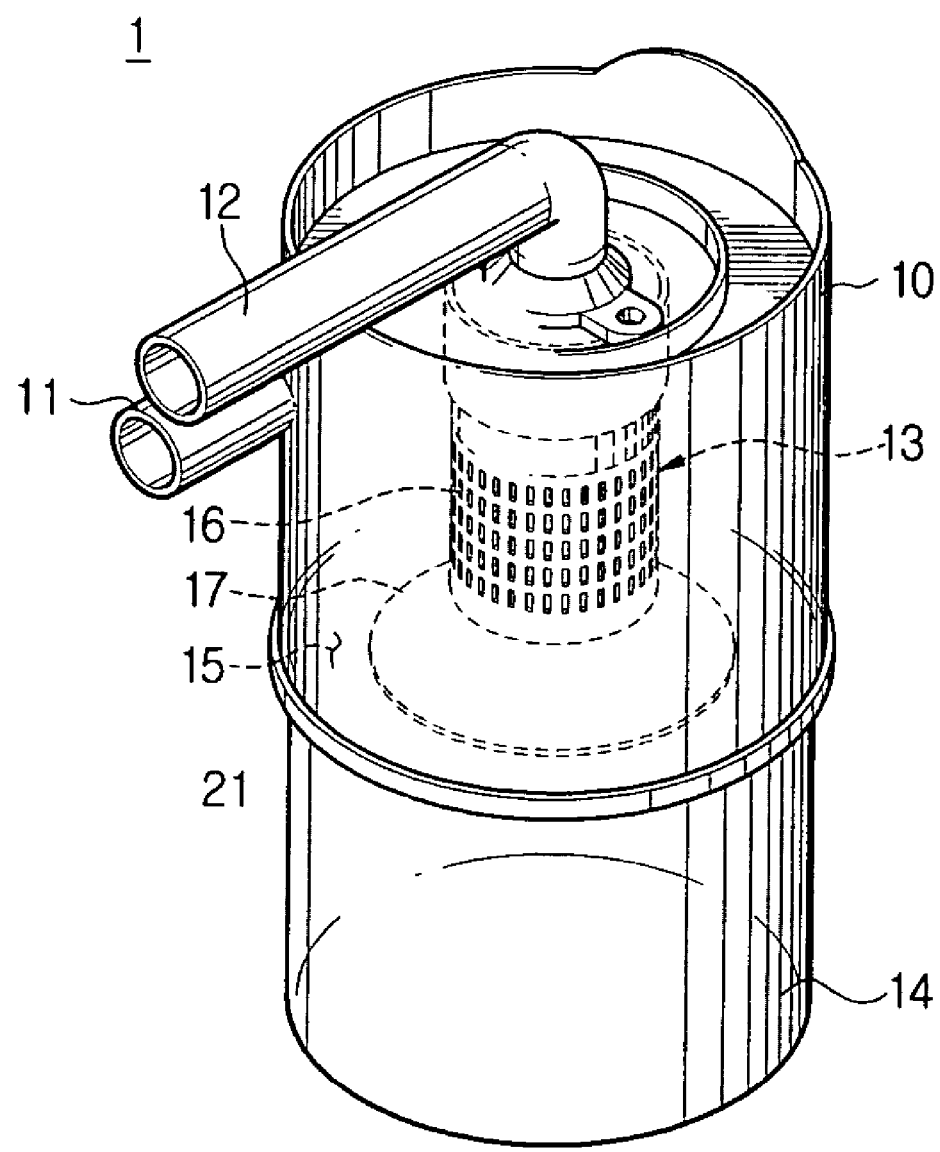
FIG. 1 is a perspective view showing a conventional cyclone dust-collecting apparatus applied to a vacuum cleaner.
Figure 2:
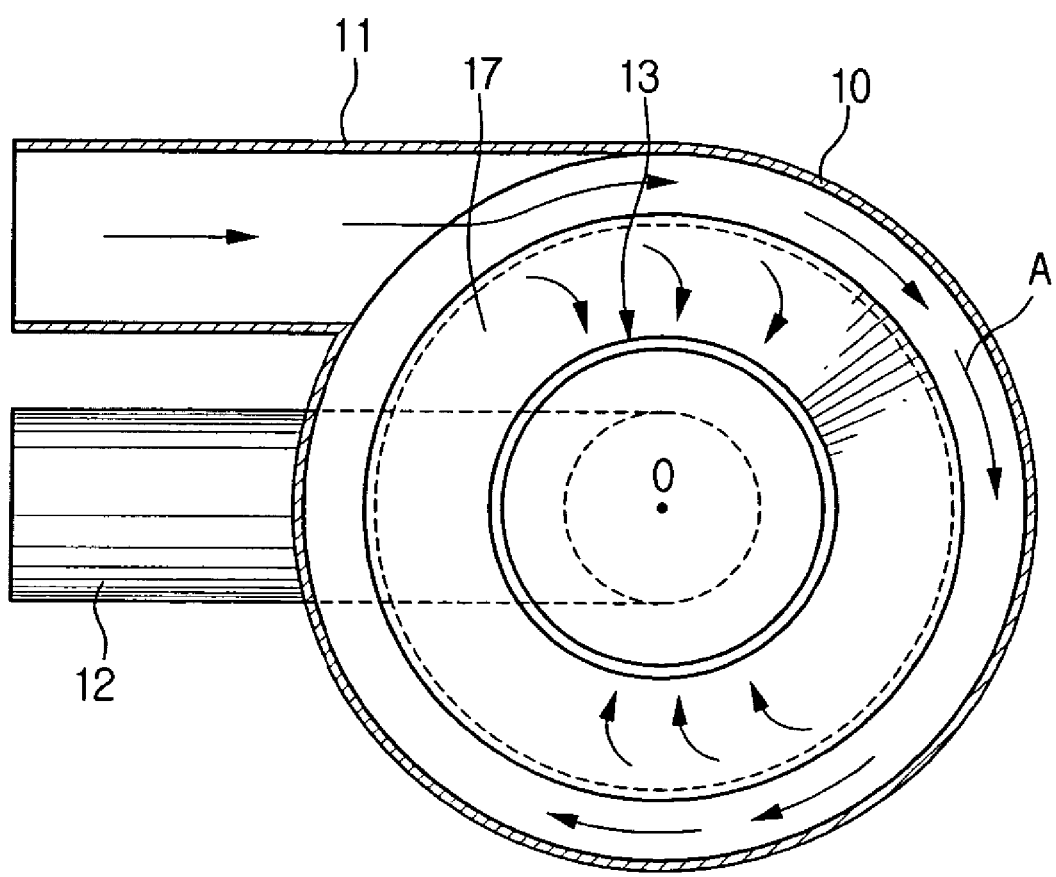
FIG. 2 is a horizontal cross-section view showing the cyclone dust-collecting apparatus of FIG. 1.
Figure 3:
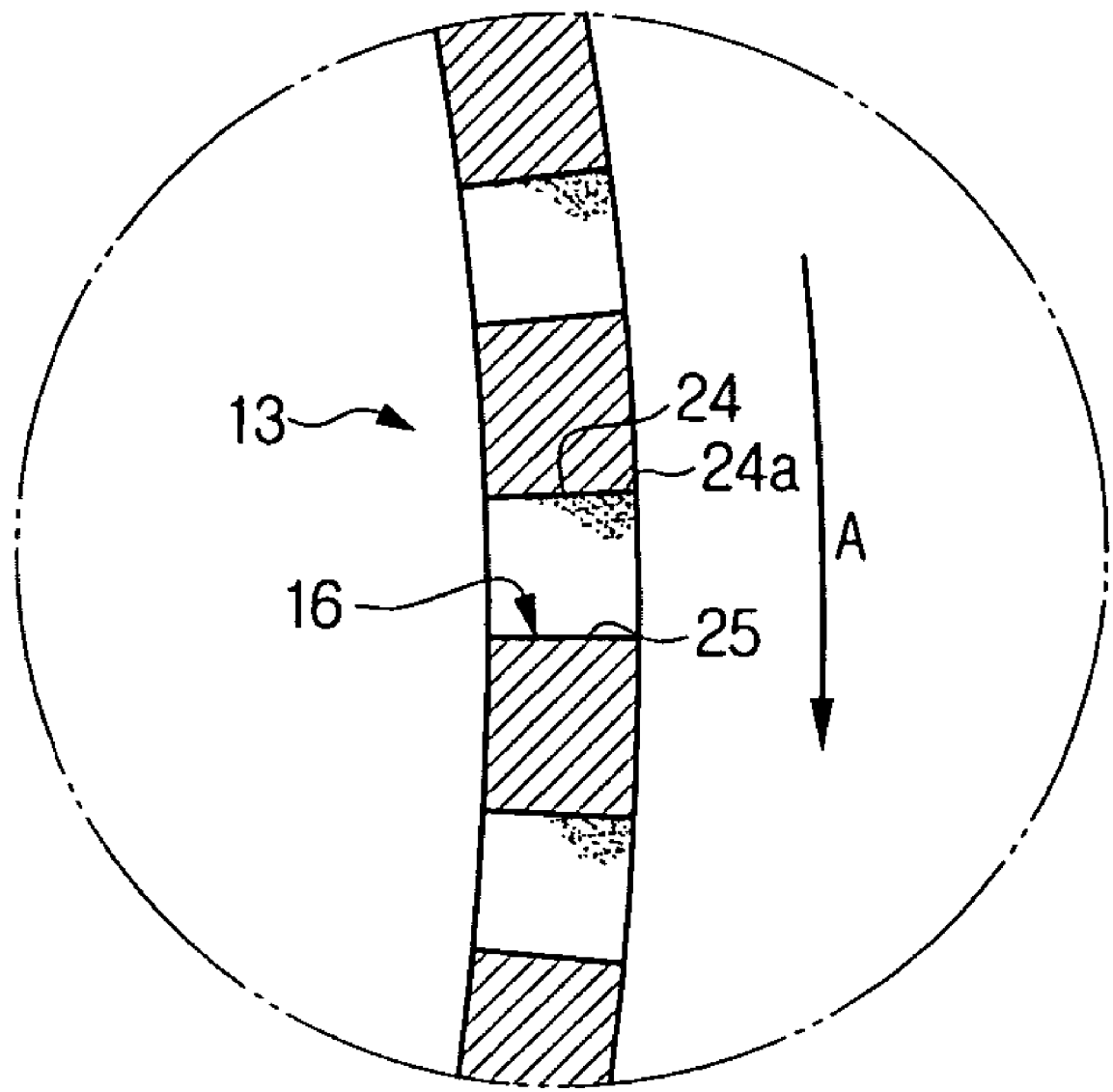
FIG. 3 is a partial horizontal cross-section view showing a grille member of the cyclone dust-collecting apparatus of FIG. 1.

The tail surface 135 consists of first and second faces 135a and 135b. The first and second faces 135a and 135b are formed so that planes extending from the first and second faces 135a and 135b and a line created by the flow direction of the rotating current meet respectively at first and second angles θ and θ', each of which is an obtuse angle (i.e. between 90 and 180 degrees), at an upstream side of the flow direction of the rotating current. This angular relationship is preferred so that the first and second faces 135a and 135b of the tail surface 135 accommodate themselves to the flow direction of the rotating current, with such a result that stagnant vortices, which would otherwise gather dust and the like as in the conventional grille member 13 explained with reference to FIG. 3, are not generated at or in the vicinity of the tail surface 135. Accordingly, in the vicinity of the tail surface 135, dust and the like are not gathered or accumulated, and are not discharged from the dust-collecting apparatus 100 during startup of the vacuum cleaner 200, thereby preventing a dust filter (not shown) from clogging, which would reduce performance of the vacuum cleaner 200.

Although it is preferable that the first and second faces 135a and 135b of the tail surface 135 are configured respectively to have first and second angles θ and θ', each of which is in the range of an obtuse angle (90-180 degrees) at each air passage 133, they can be configured respectively to have first and second angles θ and θ', each of which is gradually varied within the range of an obtuse angle at each air passage 133 for ease of fabrication.

In this embodiment, the leading surface 136 is formed so that a plane extending along the leading surface 136 and the line created by the flow direction of the rotating current meet at a third angle β which is in the range from greater than 90° to less than 180°, at the upstream side of the air passage 133 relative to the flow direction of the rotating current. This embodiment is preferred over embodiments where the plane extending from the leading surface 136 and a line along the flow direction of the rotating current meet at an acute angle. In such cases, the leading surface opposes the flow direction of the rotating current, preventing dirt in the intake air flowing along the inner circumference of the cyclone body 103 from easily entering the air passages 133. As a result, the amount of air drawn in through the air passages 133 is reduced, thereby reducing air intake efficiency of the vacuum motor. In addition, molding fabrication of the grille is more difficult, since the air passages 133 have a slot shape.

Like the tail surface 135, the leading surface 136 can be configured to have third angle β which is same in the range of greater than 90° and less than 180° at every air passages 133, or which is gradually varied in the range of greater than 90° and less than 180° at each air passage 133.

Referring again to FIG. 5, the dirt receptacle 140 is removably mounted on a lower portion 115 of the cylindrical trunk 106. The dirt receptacle 140 collects and stores the dirt that has been centrifugally separated from the intake air by the rotating current along the inner circumference of the cylindrical trunk 106. The dirt falls through a communication space 117 formed between the cylindrical trunk 106 and the dirt receptacle 140, and into dirt receptacle 140, due to action of the rotating air current or gravity. The dirt that is downwardly guided in a spiral direction by the downstream guide part 150 to be described in detail below is also collected in the dirt receptacle 140.

The downstream guide part 150 has first and second guide members 151 and 175. The first guide member 151 is formed under the cylindrical body 131 of the grille member 130 in a spiral direction. The first guide member 151 downward guides the dirt separated from the intake air by the rotating current to the dirt receptacle 140. The second guide member 175 is formed opposite to a cut-off part 161 on the inner circumference of the cylindrical trunk 106.

As shown in FIG. 7, in an embodiment, the first guide member 151 consists of a spiral flange 155 having the cut-off part 161. The flange 155 is integrally formed with a lower and outer circumference of the cylindrical body 131. The cut-off part 161 comprises a first portion 163 conforming to the flow direction of the rotating air current and a second portion 165 opposing to the flow direction of the rotating current, which is higher than the first portion 163.

In the embodiment shown, the second guide member 175 consists of a rib 176 downwardly and gradually inclining in the flow direction of the rotating air current as going from a first position P1 that is over the first portion 163 of the cut-off part 161 to a second position P2 that is over the second portion 165.

Although it has been exemplified herein that the cyclone dust-collecting apparatus 100 is employed in the upright vacuum cleaner, this should not be considered as limiting. The cyclone dust-collecting apparatus 100 can be applied to other types of vacuum cleaner, for example, a canister vacuum cleaner using the same general principles and construction.

Hereinafter, operation of the vacuum cleaner 200 having the cyclone dust-collecting apparatus 100 in which the grille member 130 according to the present invention is applied will now be described with reference to FIGS. 4 through 9.

When dirt-laden air is drawn into the cleaner body 101 through the suction brush 102 from a cleaning surface by the vacuum motor of the cleaner body 101, the intake air flows into the cyclone body 103 through the first pipe 111 of the suction part 110 connected to the suction brush 102 and rotates along the inner circumference of the cylindrical trunk 106 in the direction indicated by the arrows A', as shown in FIG. 6.

When the drawn-in air rotates along the inner circumference of the cylindrical trunk 106 as described above, stagnant vortices are not generated at or in the vicinity of the tail surface 135, since the first and second faces 135a and 135b of the tail surface 135 are configured respectively to have the first and second angles θ and θ', each of which is in the range of obtuse angle at each air passage 133 and the leading surface 136 is configured to have the third angle β which is in the range of more than 90° and below 180°. As a result, in the vicinity of the tail surface 135, dirt, especially fine dust and the like is not gathered or accumulated by the stagnant vertices.

Also, as the drawn-in air whirls along the inner circumference of the cylindrical trunk 106, general dirt included in the drawn-in air is centrifugally separated by the whirling current and gathered along the inner circumference of the cylindrical trunk 106. The gathered dirt falls down to the dirt receptacle 140 via the communication space 117 between the cylindrical body 106 and the dirt receptacle 140 by the whirling current and gravity.

Of dirt included in the drawn-in air, a heavy dirt does not move toward the inner circumference of the cylindrical trunk 106 due to its weight and still rotates in the direction indicated by the arrows A' of FIG. 6 along an upper surface of the flange 155. At this time, since the second portion 165 of the cut-off part 161 formed opposite to the whirling current is higher than the first portion 163, the heavy dirt cannot jump over the second portion 165 of the cut-off part 161 even if it is applied with a rotation inertia from the whirling current, and moves under the second part 165. As a result, the heavy dirt is downwardly guided in a spiral direction along an under surface of the flange 155 and drops down to the dirt receptacle 140.

Also, when the general dirt and/or the heavy dirt collected in the dirt receptacle 140 is scattered and ascended by collision with new dirt centrifugally separated and dropped down or the abnormal turbulent to collide with the inner circumference of the cylindrical trunk 106, it is downwardly guided by the rib 176 or along the under surface of the flange 155, and again collected in the dirt receptacle 140. Thus, even though the general dirt and/or the heavy dirt is again scattered and ascended by collision with new dirt centrifugally separated and dropped down or the abnormal turbulent, it is blocked by the rib 176 and the lower surface of the flange 155 and does not backflow to the cylindrical trunk 106 of the cyclone body 103.

The air from which the dirt including the general dirt and/or the heavy dirt has been centrifugally separated is drawn in through the air passages 133 of the cylindrical body 131 of the grille member 130 connected to the intermediate pipe 105, and discharged from the cyclone dust-collecting apparatus 100 through the second pipe 121 of the discharge part 120.

After repeating the operation described above, when the vacuum motor is stopped, cleaning operation of the vacuum cleaner 200 is completed. At this time, in the vicinity of the tail surface 135, dust or the like is not gathered or accumulated by the stagnant vertices. Accordingly, even though the vacuum motor is again driven for cleaning, there is no thing that as in the conventional grille member 13 of the dust-collecting apparatus 1 explained with reference to FIG. 3, the dust or the like gathered or accumulated in the vicinity of the front ends 24a of the tail surfaces 24 is discharged out of the dust-collecting apparatus I by the early discharging air passing through the air passages 16 during the early operation of the vacuum cleaner. As a result, the dust filter is prevented from being clogged by the dust and the like discharged out of the dust-collecting apparatus 100 to deteriorate the dust-collection performance of the vacuum cleaner.

As apparent from the foregoing description, the grille member, the cyclone dust-collecting apparatus and the vacuum cleaner having the same is provided with the cylindrical body having a plurality of air passages, each of which is formed so that at least one plane extended from the tail surface and the line created by the proceeding direction of the whirling current meet at the first angles θ, which is in the range of obtuse angle, at the upstream side of the proceeding direction of the whirling current. Therefore, the dust and the like is not gathered or accumulated in the vicinity of or at the tail surfaces of the air passages when the dirt is centrifugally separated from the drawn-in air by the whirling current, with the result that it wouldn't be discharged out of the dust-collecting apparatus by the early discharging air during the early operation of the vacuum cleaner. Accordingly, the problem that the dust filter is clogged by the dust and the like discharged out of the dust-collecting apparatus can be solved, and thereby the dust-collection performance of the vacuum cleaner is improved.

The foregoing embodiment and advantages are merely exemplary and are not to be construed as limiting the present invention. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A grille member comprising:
   a body adapted to support formation of an air current rotating around the body; and
   a plurality of air passages formed at the body to guide the rotating current into the body, each of the air passages having a leading surface generally facing into a flow direction of the rotating current and a tail surface upstream from the leading surface relative to the flow direction;
   wherein the body is adapted to allow air to draw in the rotating current so that the rotating current, when passing over each of the air passages, first reaches a start of the tail surface and ends at a start of the leading surface;
   wherein each of the air passages is formed so that at least one plane extending along the tail surface and a line along the flow direction of the rotating current meet at an obtuse angle at an upstream side of the flow direction of the rotating current; and
   wherein the tail surface comprises first and second faces formed so that the planes of the first and the second faces and the line along the flow direction of the rotating current meet respectively at first and second angles, each of which is an obtuse angle, at the upstream side of the flow direction of the rotating current.

2. The grille member of claim 1, wherein each of the air passages is formed so that at least one plane extended from the leading surface and the line along the flow direction of the rotating current meet at an angle in the range of greater than 90° and less than 180° at the upstream side of the flow direction of the rotating current.

3. The grille member of claim 1, wherein each of the air passages has a slot shape.

4. A cyclone dust-collecting apparatus comprising:
   a cyclone body having a suction part through which air is drawn in and a discharge part through which the air is discharged;
   a grille member connected to the discharge part; and
   a dirt receptacle connected to the cyclone body, for collecting and storing dirt separated from the air drawn in through the suction part;
   wherein the grille member comprises a body around which a rotating air current is formed, and a plurality of air passages formed at the body to guide the rotating air current into the body, each of the air passages having a leading surface facing toward a flow direction of the rotating air current and a tail surface upstream from the leading surface relative to the rotating current, such that at least one plane extending along the tail surface and a line along the flow direction of the rotating air current meet at an obtuse angle at an upstream side of the flow direction of the rotating current;
   wherein the suction part is arranged with respect to the cyclone body so that air is drawn in and directed in the rotating current so that the rotating current, when passing over each of the air passages, first reaches a start of the tail surface and ends at a start of the leading surface.

5. The cyclone dust-collecting apparatus of claim 4, wherein each of the air passages is formed so that at least one plane extending along the leading surface and said line along the flow direction of the whirling current meet at an angle in the range of greater than 90° and less than 180°.

6. The cyclone dust-collecting apparatus of claim 4, wherein each of the air passages has a slot shape.

7. A vacuum cleaner comprising:

a cleaner body having a vacuum suction member installed therein;

a suction brush connected to the cleaner body and movable along a cleaning surface; and a cyclone dust-collecting apparatus removably mounted in the cleaner body, comprising a cyclone body having a suction part through which air is drawn in and a discharge part through which the air is discharged, a grille member connected to the discharge part, and a dirt receptacle connected to the cyclone body, for collecting and storing dirt separated from the air drawn in through the suction part;

wherein the grille member comprises a body around which a rotating air current is formed, and a plurality of air passages formed at the body to guide the rotating air current into the body, each of the air passages having a leading surface facing toward a flow direction of the rotating air current and a tail surface upstream from the leading surface relative to the rotating air current, such that at least one plane extending along the tail surface and a line along the flow direction of the rotating air current meet at an obtuse angle at an upstream side of the flow direction of the rotating air current;

wherein the suction part is arranged with respect to the cyclone body so that air is drawn in and directed in the rotating current so that the rotating current, when passing over each of the air passages, first reaches a start of the tail surface and ends at a start of the leading surface.

8. The vacuum cleaner of claim 7, wherein each of the air passages is formed so that at least one plane extending along the leading surface and said line along the flow direction of the whirling current meet at an angle in the range of greater than 90° and less than 180°.

9. The vacuum cleaner as claimed in claim 7, wherein each of the air passages has a slot shape.

10. A grille member comprising:

a body adapted to support formation of an air current rotating around the body; and a plurality of air passages formed at the body to guide the rotating current into the body, each of the air passages having a leading surface generally facing into a flow direction of the rotating current and a tail surface upstream from the leading surface relative to the flow direction;

wherein the body is adapted to draw in the rotating current so that the rotating current, when passing over each of the air passages, first reaches a start of the tail surface and ends at a start of the leading surface;

wherein each of the air passages is formed so that at least one plane of the tail surface and a line along the flow direction of the rotating current meet at an obtuse angle at an upstream side of the flow direction of the rotating current; and wherein the leading surface and the tail surface form a curved surface.

* * * * *